Jan. 31, 1933.  W. R. GRISWOLD  1,896,025

MOTOR VEHICLE CLUTCH

Filed March 17, 1928

Inventor
WALTER R. GRISWOLD
By *Milton Tibbets*
Attorney

Patented Jan. 31, 1933

1,896,025

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE CLUTCH

Application filed March 17, 1928. Serial No. 262,543.

This invention relates to motor vehicles and to the transmission mechanism of such vehicles, and it has for its principal object to provide means for damping vibratory disturbances in such transmission mechanism.

Another object of the invention is to provide a motor vehicle having transmission mechanism with means to frictionally dissipate the energy of torsional vibration in the transmission.

Another object of the invention is to provide a motor vehicle having transmission mechanism including a resilient member which will yield to cushion and relieve shocks on the gears and other toothed members of the transmission.

A further object of the invention is to provide a motor vehicle having such a resilient transmission member and having friction damping means assisted by the resilient member to control torsional vibration in the mechanism.

Other objects of the invention will appear from the following description taken in connection with the drawing, which forms a part of this specification, and in which.

Figure 1:
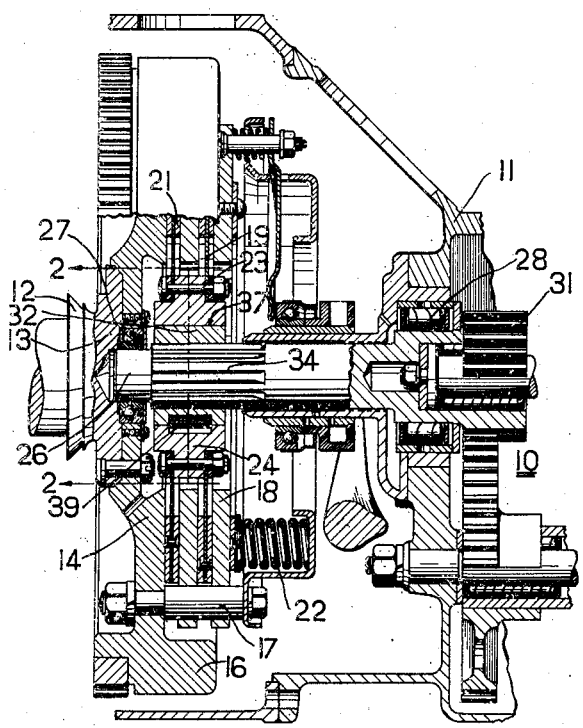
Fig. 1 is a vertical longitudinal section through part of the transmission mechanism of a motor vehicle, embodying this invention.
Figure 3:
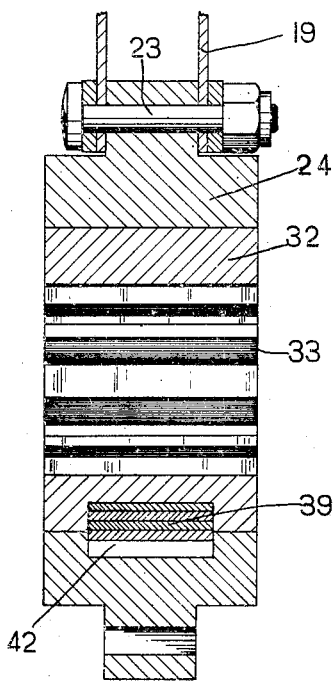
Fig. 3 is an enlarged sectional view, of the clutch hub and the damping means of this invention.

In motor vehicles as now commonly constructed, the torque of the engine crank shaft is transmitted to the driving wheels through transmission mechanism including a propeller shaft, axles and gearing, the gearing being connected to the crank shaft through a clutch. Such a transmission constitutes a torsionally elastic system which may vibrate under certain conditions in accordance with the well known laws governing such systems. When the vehicle is allowed to coast down against the engine there is a large fluctuating inertia torque in the engine crank shaft, which is alternately positive and negative, and which constitutes a periodic force applied to the transmission through the clutch. When this force is in synchronism with any of the natural periods of vibration of the transmission mechanism a more or less violent torsional disturbance occurs, which has the effect of alternately taking up and releasing all of the back lash in the transmission gearing and in the clutch, causing an unpleasant noise, and a particularly undesirable sensation to occupants of the vehicle. The present invention provides means for eliminating such disturbances.

Referring to the drawing, at 10 is shown a portion of the transmission mechanism of a motor vehicle, mounted in a suitable housing or gear case 11, and adapted to be driven from an engine crank shaft 12 in the usual manner. The rear end of the crank shaft 12 is provided with an integral flange 13 to which is secured the web of an engine flywheel 14, having the usual annular rim portion 16.

For driving purposes the flywheel 14 is provided with axially projecting pins 17, on which are mounted the driving elements or plates 18 of a friction clutch of conventional construction. Disposed between and operatively engageable with the driving plates 18 are driven plates 19, preferably provided with suitable friction facing 21, and these driving and driven plates are urged axially into engagement by suitable clutch engaging means such as the springs 22. The clutch is provided with the usual disengaging or throw-out mechanism, which is not illustrated in detail but which may be manually operated to separate the driving and driven plates against the springs 22 in the well known manner. The driven plates 19 are rigidly secured, as by the bolts 23, to a clutch hub 24, through which the driving torque is transmitted to the gearing.

This driven clutch hub 24 is connected to and adapted to drive a transmission or clutch shaft 26, which shaft is mounted at its forward end in a bearing 27 carried in the web 14 of the flywheel, and at its rear end in bearings 28 suitably supported in the transmission housing 11. The shaft 26 is provided with a transmission gear 31, which is preferably the constant mesh pinion of the conventional change-speed gearset, and which is adapted to drive the propeller shaft of the vehicle through a suitable geared reduction, not shown. As mechanism of this nature is well known in the art to which this invention relates, further description thereof is unnecessary.

The damping means of this invention is preferably located between the transmission shaft 26 and the driven clutch hub 24, and it consists of a member which, as shown, is in the form of a bushing 32, having internal teeth or splines 33 adapted to engage and drive cooperating splines 34 formed on the shaft 26. This damping member or bushing 32 has an outside bearing surface 36, on which it is rotatably mounted in an axial bore 37 in the clutch hub 24, forming a bearing therein.

These members are preferably connected in driving relation by a resilient coupling. In the form illustrated this coupling comprises a spring 38, which is conveniently of the laminated type, and which is adapted to bear at its central portion on a flat driving face or surface 39 on the member 32. The ends of this spring are seated on abutments 41 formed in a recess 42 in the clutch hub 24. The spring 38 thus constitutes a resilient key, operatively connecting the clutch hub to the member 32. It is preferably placed under an initial stress, which may be secured by forming it with a slight reverse bend, convex toward the driving face 39.

Figure 2:
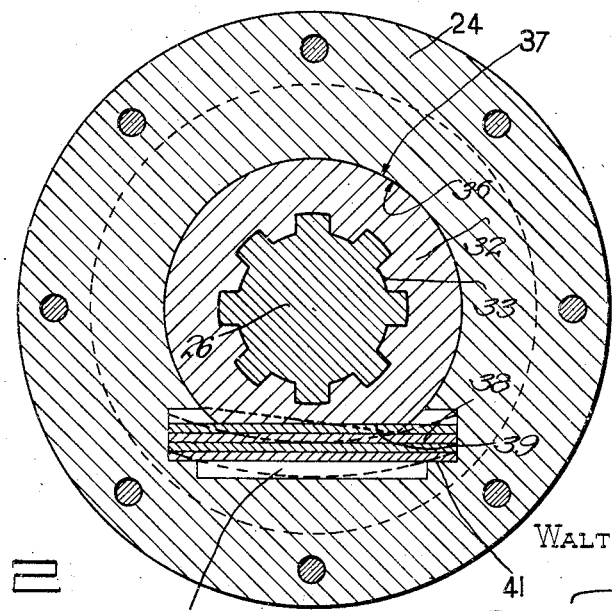
Fig. 2 is a transverse section to a larger scale through the mechanism shown in Fig. 1, taken substantially on the line 2—2 of Fig. 1.

It will be clearly understood from the foregoing description that the spring 38 is adapted to yield by bending upon the transmission of unusual stresses, such as may occur for example from road shocks to the vehicle driving wheels, or upon starting or accelerating the vehicle. In such cases the spring is deflected between the abutments 41 by the member 32, which moves relatively to the member 24, as is clearly indicated in dotted lines in Fig. 2. The bottom of the recess 42 forms a stop to prevent excessive bending of the spring. The resilient connection thus provided relieves the splines 34 and the teeth of the transmission gear of much shock and wear.

The spring 38 also serves to greatly increase the bearing pressure at the surfaces 36 and 37, between the bushing member and the clutch hub. This pressure increases the frictional resistance to relative movement between these parts, which constitutes most of the damping friction of the device. The friction between the leaves of the spring 38 also assists in the damping action. It will be evident that the rapid oscillatory movement of the damping member 32 with respect to the clutch hub 24, which occurs during a period of vibration, is opposed by this friction, which dissipates vibratory energy at a rate sufficient to prevent the resonant growth thereof, thus effectually damping the disturbance in the well known manner.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a motor vehicle having transmission mechanism including driving and driven elements, means acting between said elements capable of developing friction to damp vibration in the mechanism, and a resilient driving connection between said elements adapted to increase the friction developed by said means.

2. In a motor vehicle having transmission mechanism including a clutch and a transmission shaft, a resilient driving connection between said clutch and shaft, and means including friction surfaces associated with said elements and engaged by the pressure of the resilient connection for developing friction to damp vibration in said shaft.

3. In a motor vehicle having transmission mechanism including a clutch and a transmission shaft driven therefrom, a hub for said clutch having a recess, a spring connected to said shaft and adapted to seat in the recess, and a bearing for said shaft in the hub, the friction of said bearing being increased by the spring.

4. In a motor vehicle having transmission mechanism including a clutch and a transmission shaft driven therefrom, a hub for said clutch having a friction bearing for the shaft, and spring means connecting said hub and shaft adapted to increase the bearing pressure between the shaft and said bearing.

5. A motor vehicle transmission having frictionally engaging elements forming a vibration damper, and a resilient coupling between the elements adapted to increase the friction.

6. In a motor vehicle having transmission mechanism, a resilient coupling member in said transmission mechanism, and friction damping means for said transmission including a bearing loaded by said resilient coupling.

7. In a motor vehicle having transmission mechanism including a driving hub and a driven shaft, means including a spring operatively connecting said hub and shaft, and a bearing between said hub and shaft loaded by said spring.

8. In a motor vehicle having transmission mechanism including a driving hub and a driven shaft, a bearing member rotatably mounted on the hub having a driving connection with said shaft and having a driving face adjacent said hub, and a transverse spring mounted in said hub and engaging said face to resiliently connect the hub and bearing member, said spring increasing the bearing pressure between said member and the hub.

In testimony whereof I affix my signature.
WALTER R. GRISWOLD.